United States Patent
Schulte

(10) Patent No.: US 11,288,519 B2
(45) Date of Patent: Mar. 29, 2022

(54) OBJECT COUNTING AND CLASSIFICATION FOR IMAGE PROCESSING

(71) Applicant: FLIR Belgium BVBA, Meer (BE)

(72) Inventor: Stefan Schulte, Marke (BE)

(73) Assignee: FLIR Belgium BVBA, Meer (BE)

( * ) Notice: Subject to any disclaimer, the term of this patent is extended or adjusted under 35 U.S.C. 154(b) by 155 days.

(21) Appl. No.: 15/996,354

(22) Filed: Jun. 1, 2018

(65) Prior Publication Data

US 2019/0005336 A1   Jan. 3, 2019

Related U.S. Application Data

(60) Provisional application No. 62/527,935, filed on Jun. 30, 2017.

(51) Int. Cl.
| | | |
|---|---|---|
| *G06K 9/00* | (2006.01) | |
| *G06K 9/62* | (2022.01) | |
| *G06T 7/13* | (2017.01) | |
| *G06T 7/246* | (2017.01) | |
| *G06K 9/46* | (2006.01) | |
| *G06T 7/90* | (2017.01) | |

(52) U.S. Cl.
CPC ..... *G06K 9/00785* (2013.01); *G06K 9/00771* (2013.01); *G06K 9/4604* (2013.01); *G06K 9/6218* (2013.01); *G06K 9/6267* (2013.01); *G06T 7/13* (2017.01); *G06T 7/248* (2017.01); *G06K 2209/23* (2013.01); *G06T 7/90* (2017.01); *G06T 2207/10048* (2013.01); *G06T 2207/30236* (2013.01); *G06T 2207/30242* (2013.01)

(58) Field of Classification Search
CPC .......... G06K 2209/23; G06K 9/00771; G06K 9/00785; G06K 9/4604; G06K 9/6218; G06K 9/6267; G06T 2207/10048; G06T 2207/30236; G06T 2207/30242; G06T 7/13; G06T 7/248; G06T 7/90
See application file for complete search history.

(56) References Cited

U.S. PATENT DOCUMENTS

| 8,358,808 B2 | 1/2013 | Malinovskiy et al. | |
|---|---|---|---|
| 2006/0269104 A1* | 11/2006 | Ciolli | G08G 1/052 382/104 |
| 2009/0102699 A1* | 4/2009 | Behrens | G01S 13/585 342/109 |

(Continued)

OTHER PUBLICATIONS

Albiol et al., "Detection of Parked Vehicles Using Spatiotemporal Maps," IEEE Transactions on Intelligent Transportation Systems, Dec. 2011, pp. 1277-1291, vol. 12, No. 4, IEEE.

*Primary Examiner* — Manuchehr Rahmjoo
(74) *Attorney, Agent, or Firm* — Haynes and Boone, LLP

(57) ABSTRACT

Systems and methods according to one or more embodiments are provided for classifying and counting objects that pass through monitored zones in a field of view of an imaging device. An imaging device receives a series of images of a target scene having at least one monitored zone. An image processor extracts a target line of image values from each image, and adds the target line to a first spatio-temporal image. An edge detector and a cluster analysis module analyzes the first spatio-temporal image to identify objects associated with the at least one zone. An object classifier classifies in object and stores tracking information.

20 Claims, 6 Drawing Sheets

(56) References Cited

U.S. PATENT DOCUMENTS

| | | |
|---|---|---|
| 2011/0170744 A1 | 7/2011 | Malinovskiy et al. |
| 2014/0159925 A1* | 6/2014 | Mimeault .............. G08G 1/054 |
| | | 340/935 |
| 2015/0310615 A1* | 10/2015 | Bulan .................. G06K 9/6267 |
| | | 348/143 |

* cited by examiner

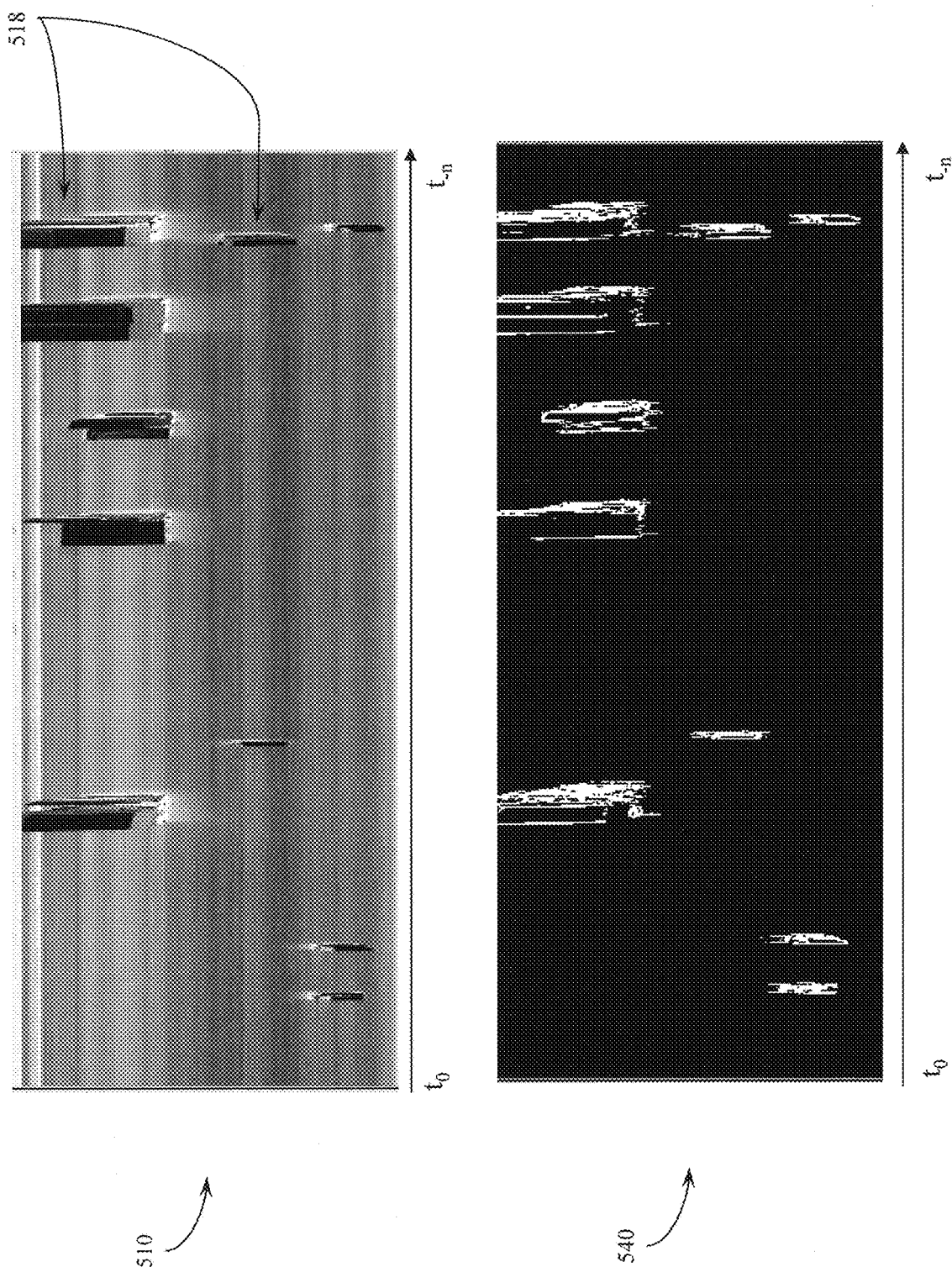

OBJECT COUNTING AND CLASSIFICATION FOR IMAGE PROCESSING

CROSS REFERENCE TO RELATED APPLICATIONS

This application claims the benefit of and priority to U.S. Provisional Patent Application No. 62/527,935 filed Jun. 30, 2017 and entitled "OBJECT COUNTING AND CLASSIFICATION FOR IMAGE PROCESSING," which is incorporated herein by reference in its entirety.

TECHNICAL FIELD

The present invention relates generally to image processing and, more particularly, for example, to processing images to identify, classify and/or count objects in a field of view of an imaging device.

BACKGROUND

In the field of image processing, there are ongoing efforts to provide efficient and reliable detection and classification of objects of interest within a field of view of an imaging device. One known approach utilizes general subtraction methods to obtain a foreground of a scene that can be analyzed to determine if an object is present and, if so, further analyze the image to identify and classify the detected object. Several issues arise from conventional techniques, particularly in applications requiring real time processing due to the excessive amount of image data that must be processed, communicated and stored. Thus, there is an ongoing need for object detection and classification solutions that provide performance or other advantages over conventional image processing systems.

SUMMARY

Systems and methods are disclosed herein in accordance with one or more embodiments that provide an improved approach for identifying, classifying and/or counting objects of interest within the field of view of an imaging device.

In one embodiment, a method includes receiving a sequence of images of a target scene captured from an imaging device. The target scene includes at least one predefined zone through which objects are monitored. A line of pixels associated with the at least one predefined zone is extracted from each captured image. In one embodiment, the line of pixels spans the length of the zone (or zones, if multiple zones are monitored) in a direction that is substantially perpendicular to an expected direction of travel of the objects to be monitored. In various embodiments, the line of pixels may include color values, gray-scale values or other feature attributes of the image.

In one embodiment, a traffic monitoring system tracks vehicle traffic on each of a plurality of traffic lanes of a roadway. A method of operation includes disposing at least one image capture device at a location with a field of view encompassing the traffic lanes to be monitored. A monitored zone across each traffic lane and a target line spanning the monitored zones are defined. In one embodiment, the target line may extend from a shoulder of the roadway across to the center divider.

A line of pixels corresponding to the target line are extracted from each captured image frame and added to a first spatio-temporal image. The first spatio-temporal image includes a temporal sequence of extracted target lines from previously captured images. In one embodiment, a target line of pixels is extracted from a current captured image and appended as vertical line of pixels, adjacent to the target line extracted from the preceding captured image. The first spatio-temporal image is then analyzed in real time to detect edges between the most current target line and at least one preceding target line. In one embodiment, the edge detection includes calculating a probability that each pixel of the current target line is an edge, comparing the calculated probability to an edge threshold and constructing a Boolean feature vector of the Boolean results.

The Boolean feature vector is appended to a second spatio-temporal image, which is then analyzed to identify objects that pass through each monitored zone. In one embodiment, a cluster algorithm analyzes edge information and attempts to match each edge identified in the current target line with an existing cluster. If an edge is a leading edge, then a new cluster is opened. If an edge is a closing edge, then an existing cluster is closed. Each clustered object is then classified, and tracking information is stored in a memory or database in accordance with system requirements. In one embodiment, the classification includes identifying a vehicle type, such as an automobile or truck, and the stored information includes a count of each vehicle type that passes through each zone for a given time-frame.

In another embodiment, a system comprises an image capture device, an image processing module, an edge detection module, a cluster analysis module and an object classification module. The image capture device is configured to capture a series of images of a target scene, and may include a thermal camera capturing a series of thermal images, a visible light camera or other image capture device. In various embodiments, the system may include a plurality of image capture devices arranged to monitor multiple fields of view.

The image processing module is configured to extract a target line of pixel values from each captured image frame (e.g., gray-level values of the corresponding pixels). The target line is added to a first spatio-temporal image, which is maintained in memory. The edge detection module is configured to detect whether an edge is present between the target line of the current frame and at least one adjacent target line in the first spatio-temporal image. In one embodiment, each pixel of the current target line is analyzed to produce a likelihood that the pixel is associated with an edge of an object, and the likelihood is compared to an edge threshold to generate a Boolean feature vector indicating whether each pixel is determined to be an edge. The Boolean feature vector is stored in a second spatio-temporal image.

The cluster analysis module is configured to analyze the second spatio-temporal image to identify objects by clustering edge determinations. The object classification module is configured to classify each clustered object in accordance with classification criteria. In one, embodiment, the object classification system is configured to classify vehicles, such as passenger automobiles and trucks. The system may also include a memory or database for storing classification results, which may include a vehicle type associated with objects traveling through each monitored zone.

In various embodiments, the system may be configured to track objects passing through a plurality of zones, with each zone comprising a subset of the field of the view through which the objects are expected to pass. In one embodiment, the target line extends substantially across the length of the monitored zones and substantially perpendicular to a direction of travel of objects. In various embodiments, more than one target line may be defined and processed as described herein. For example, the field of view may include objects traveling in more than one direction, or monitored zones may be located at two disparate locations within a field of view.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5 illustrates edge detection in an exemplary spatio-temporal image in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
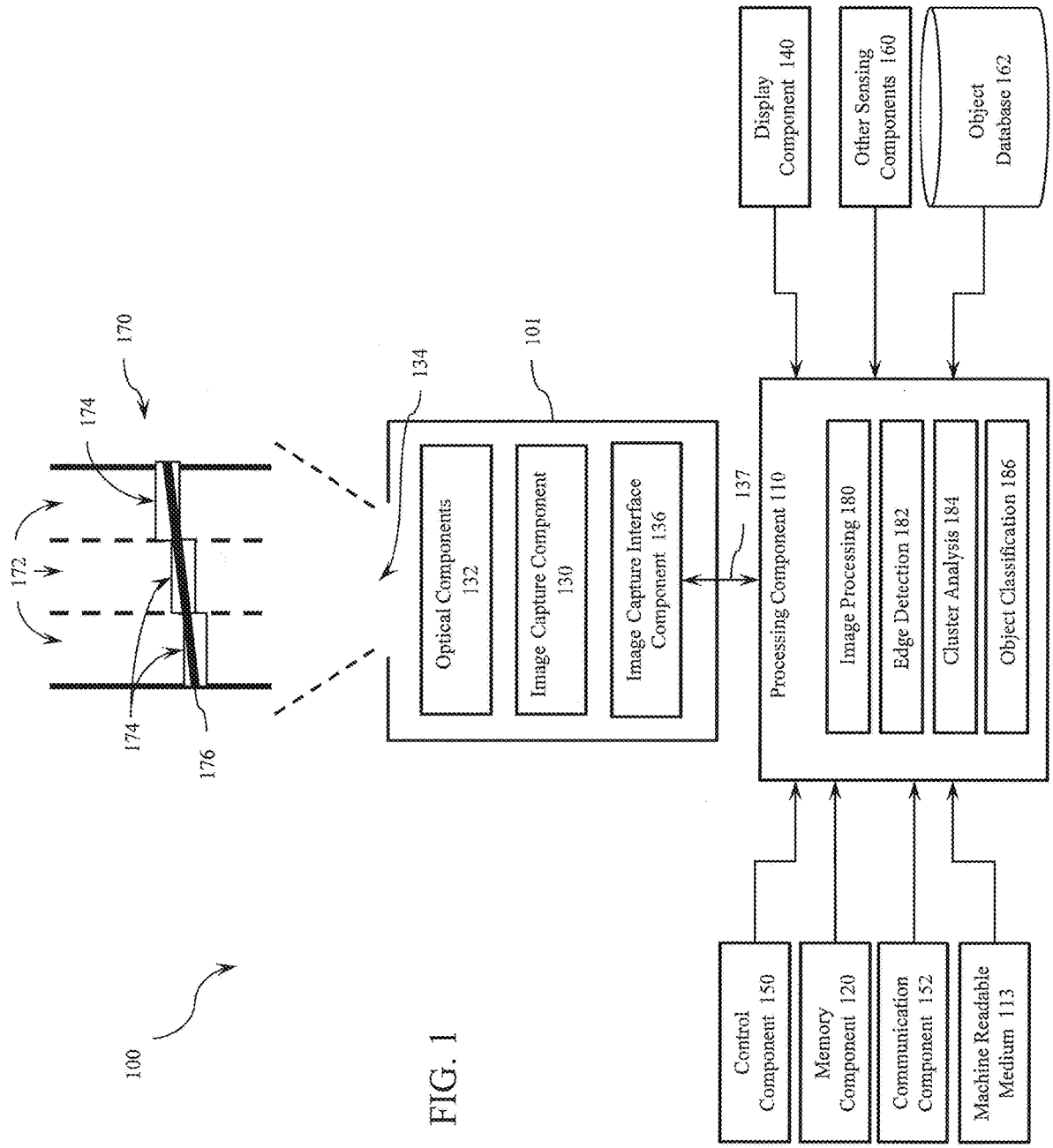
FIG. 1 illustrates a block diagram of an exemplary monitoring system in accordance with embodiments of the disclosure.

Techniques are provided to detect, classify and/or count objects of interest (e.g., a train, a tram, a metro, and/or other types of vehicles, humans, and/or animals) moving through one or more pre-defined zones within a target scene (e.g., field of view of an imaging device). The disclosed embodiments provide efficient and reliable detection of objects entering a zone of interest within a field of view of an imaging device that is suitable for real-time applications.

In one embodiment, an imaging device is configured to capture images of traffic lanes on a roadway. A zone is defined in the field of view for each monitored lane and the system is configured to identify, classify and/or count each vehicle that passes through each zone. In one embodiment, a target line is defined in the field of view, spanning the defined zones. The target line may be arranged adjacent to the zones and oriented substantially perpendicular to the direction of travel of the objects to be tracked. As disclosed herein, a method includes extracting and analyzing a target line of pixels from a sequence of captured images to identify, classify and/or count each vehicle that passes through each monitored zone.

In one embodiment, pixels corresponding with the target line are extracted from sequential frames captured by the image capture device. In various embodiments, the extracted pixels may comprise one or more rows of color values, gray-scale values, or other image attributes associated with one or more pixels of the captured image.

The extracted target line is added to a first spatio-temporal image map. In one embodiment, each successive target line is appended in sequence to the first spatio-temporal image. The first spatio-temporal image is analyzed to identify objects passing through each of the monitored zones. In one embodiment, an edge detection analysis is performed as each target line is appended to the first spatio-temporal image. For example, a Prewitt-edge may be calculated between the current target line and the preceding target line. The Prewitt-edge may be compared to an edge detection threshold to determine whether an edge is present. The Boolean result of the threshold comparison is used to construct a new Boolean feature vector associated with the target line that is appended to a second spatio-temporal image.

The second spatio-temporal map is analyzed to segment objects. In one embodiment, a cluster analysis module attempts to assign each edge of the current Boolean feature vector to an existing cluster or start a new cluster if the edge is determined to be a leading edge of a new cluster. The clustered edges represent objects passing through the monitored zones. The clusters are then classified using an object classification system, which may include a database of classification information. For example, in a traffic monitoring system, clustered objects may be classified as a truck, passenger automobile or motorcycle.

The target line extraction, edge detection, and Boolean feature vector clustering described herein allow for fast, real-time processing of captured images and doesn't require contextual information for object detection and classification (e.g., maintaining a background image of the monitored scene). The system and methods described herein can be used in a variety of applications including automotive, infrared camera, security camera, video/image processing, and visible light camera applications.

Referring to FIG. 1, an embodiment of a monitoring system of the present disclosure will be described. The monitoring system may be used to capture and process images to detect, classify and/or count objects that enter zones of interest in accordance with various techniques described herein. In one embodiment, various components of a monitoring system 100 may be provided in a camera component 101, such as an imaging camera. In other embodiments, one or more components of the monitoring system 100 may be implemented in multiple devices which may be disposed remotely from each other in a distributed fashion (e.g., networked or otherwise).

As illustrated, the monitoring system 100 may be used for monitoring object activity through at least one zone in a field of view, such as vehicle traffic on a roadway. The monitoring system 100 includes a processing component 110, a memory component 120, an image capture component 130, optical components 132 (e.g., one or more lenses configured to receive electromagnetic radiation through an aperture 134 in camera component 101 and pass the electromagnetic radiation to image capture component 130), an image capture interface component 136, a display component 140, a control component 150, a communication component 152, other sensing components 160, and an object database 162, which may include object classification and tracking information.

In various embodiments, imaging system 100 may be implemented as an imaging device, such as camera component 101, to capture image frames, for example, of a scene 170 in the field of view of camera component 101. In some embodiments, camera component 101 may include image capture component 130, optical components 132, and image capture interface component 136 housed in a protective enclosure. Imaging system 100 may represent any type of camera system including, for example, a camera that is adapted to detect visible light and/or infrared radiation and provide associated image data.

Imaging system 100 may be implemented with one or more camera components 101 at various types of fixed locations (e.g., highway overpass, train station platform, metro platform, car parking lot, or other locations) via one or more types of structural mounts. In some embodiments, camera component 101 may be mounted in a stationary arrangement to capture successive images of a target scene 170. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle).

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 is also adapted to detect and classify objects in the images captured by the image capture component 130, through image processing module 180, edge detection module 182, cluster analysis module 184, and object classification module 186.

It should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various image frames of scene 170.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine-readable medium 113 to perform various methods, processes, and operations in a manner as described herein.

Image capture component 130 includes, in one embodiment, one or more sensors (e.g., any type visible light, infrared, or other type of detector) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. In various aspects, processing component 110 may be remotely positioned, and processing component 110 may be adapted to remotely receive image signals from image capture component 130 via wired or wireless communication with image capture interface component 136, as described herein. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view, brightness, contrast, gain, offset, spatial, temporal, and/or various other features and/or parameters.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a tablet, a laptop computer, a desktop computer, or other type of device.

Processing component 110 may be adapted to communicate with image capture interface component 136 (e.g., by receiving data and information from image capture component 130). Image capture interface component 136 may be configured to receive image signals (e.g., image frames) from image capture component 130 and communicate image signals to processing component 110 directly or through one or more wired or wireless communication components (e.g., represented by connection 137) in the manner of communication component 152 further described herein. Camera 101 and processing component 110 may be positioned proximate to or remote from each other in various embodiments.

In another embodiment, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

Imaging system 100 may include an alert component adapted to interface with processing component 110 (e.g., via wired or wireless communication) and provide a notification in response to input received from processing component 110. Notification may be communicated in various formats. For example, in one embodiment, an audible signal (e.g., audible alarm) may provide notification to a user and/or persons within range of the audible signal. In another embodiment, a visible signal (e.g., flashing light) may provide notification to a user and/or persons within sight of the visible signal. An electronic message (e.g., electronic message received by a smart phone, a tablet, a personal digital assistant (e.g., a wireless, mobile device), a laptop computer, a desktop computer, or other type of device) may be communicated in response to an input received from processing component 110.

In one embodiment, communication component 152 may be implemented as a network interface component (NIC) adapted for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

In various embodiments, monitoring system 100 provides a capability, in real time, to detect, classify and count objects in the target scene 170. For example, monitoring system 100 may be configured to capture images of target scene 170 using camera 101 (e.g., a visible light camera). In the illustrated embodiment, the target scene 170 is a roadway with a plurality of lanes of travel 172; however, it will be appreciated that other scenes may be monitored as described herein. Captured images may be received by processing component 110 and stored in memory component 120. Image processing module 180 may be configured to define one or more monitored zones 174 through which the system 100 is monitoring objects, and at least one target line 176, defining pixels and image attributes to extract from a captured image frame. In one embodiment, the target line 176 spans width of the monitored zones 174 and is positioned substantially perpendicular to an expected direction of travel of the monitored objects.

In one embodiment, the image processing module 180 is configured to extract a subset of pixel values from each captured image and maintain a first spatio-temporal image in the memory component 120. The edge detection module 182 detects edges in the spatio-temporal image, generates a boolean feature vector and stores the boolean feature vector in a second spatio-temporal image stored in the memory component 120. The cluster analysis module 184 identifies object clusters in the second spatio-temporal image. The object classification system 186 uses information stored in the object database 162 to classify the clustered objects and store tracking information in the memory component 120, object database 162 or other memory storage in accordance with system preferences.

Figure 2:
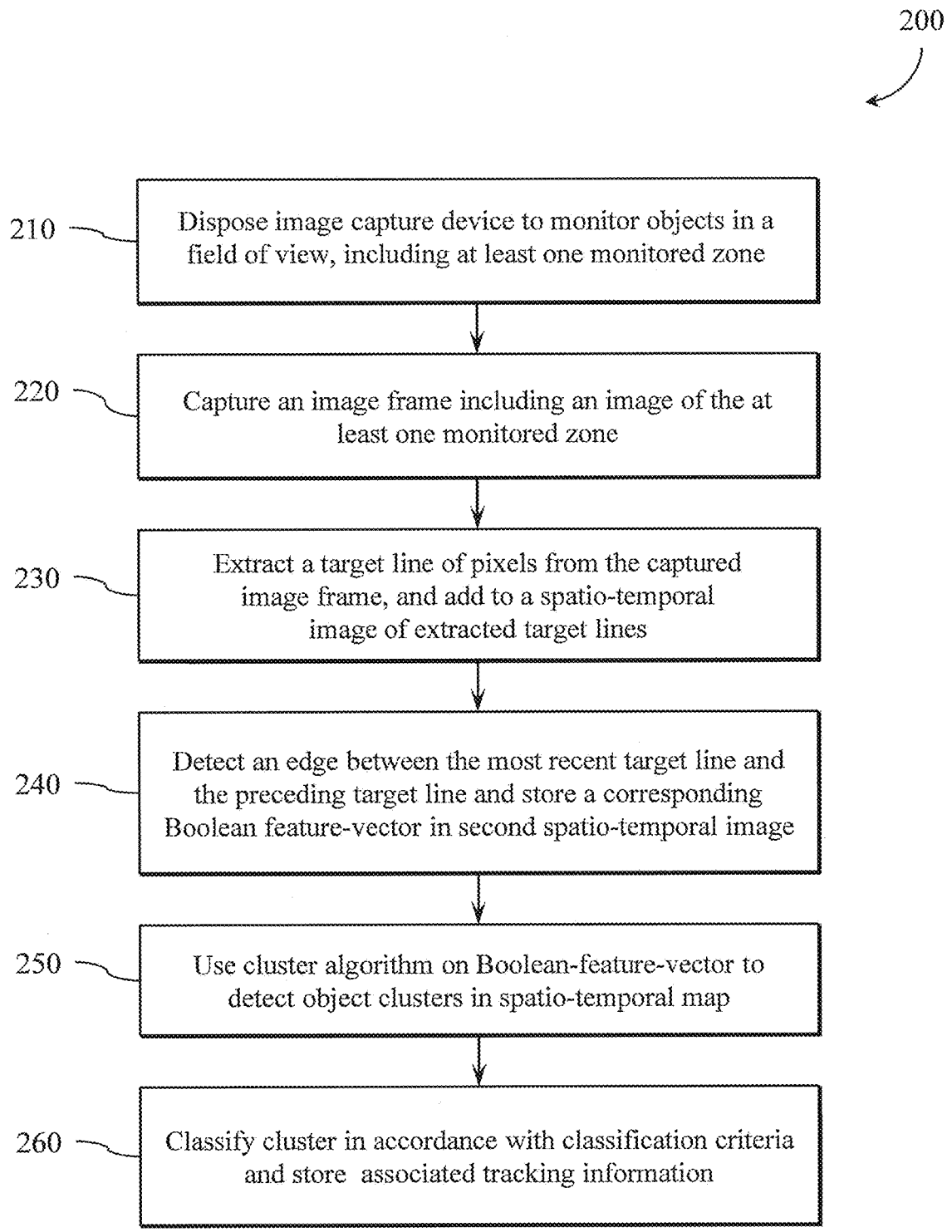
FIG. 2 is a flow chart illustrating an exemplary operation of a monitoring system in accordance with embodiments of the disclosure.

Referring to FIG. 2 an exemplary embodiment of an operation of the monitoring system of FIG. 1 will be described. In step 210, an image capture device is disposed to monitor object activity in a field of view including at least one monitored zone. In step 220, the image capture device captures an image frame of its field of view that includes an image of the at least one monitored zone.

Figure 3A:
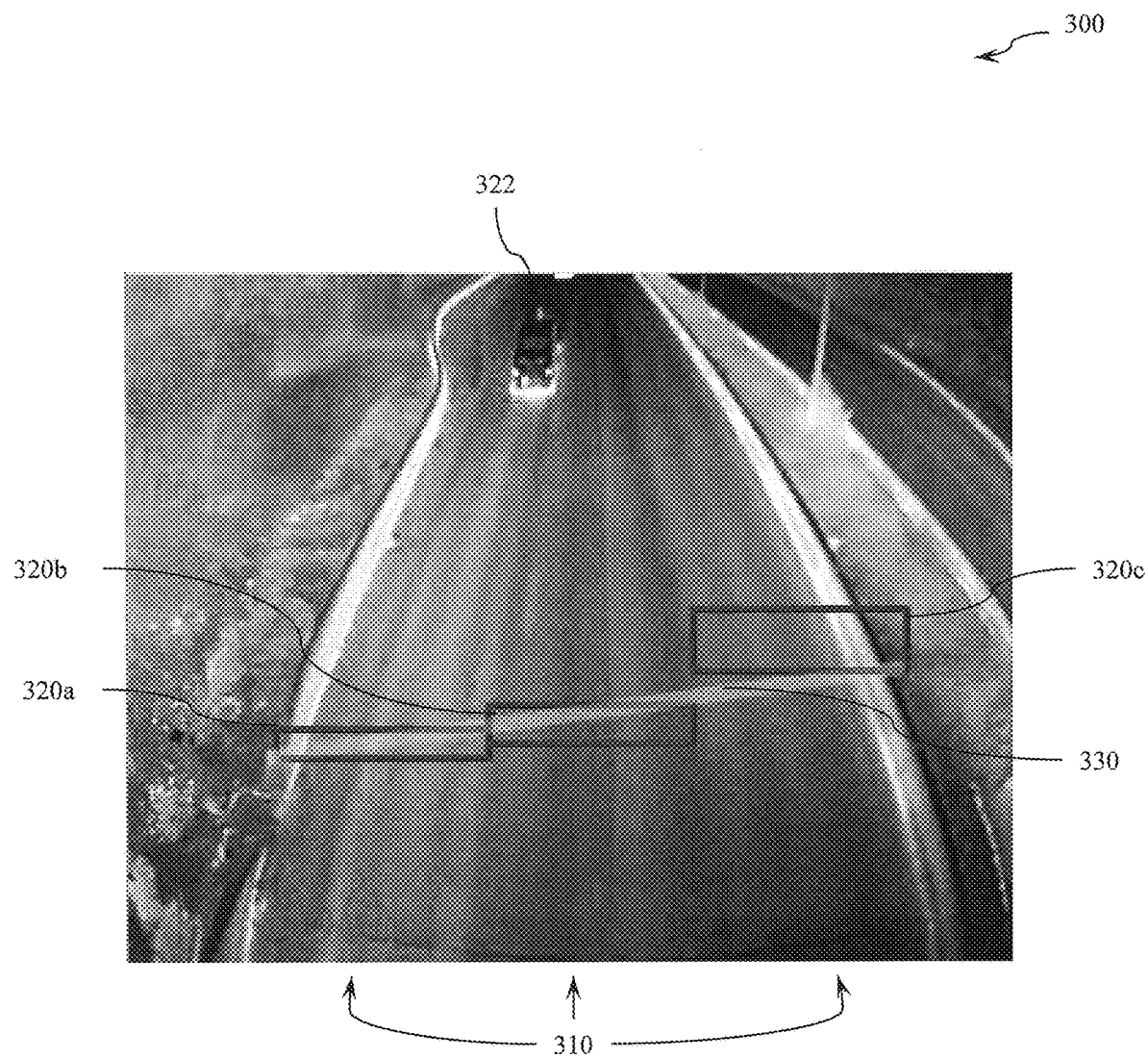
FIG. 3a illustrates an exemplary image frame of a target scene, including a plurality of monitored zones and a tracking line, in accordance with embodiments of the disclosure.

FIG. 3a illustrates a captured image 300 of an exemplary target scene captured by an image capture device. As illustrated, the image capture device is positioned over a roadway to identify, classify and/or count traffic activity in one or more traffic lanes 310. The monitoring system is configured to monitor traffic through three monitored zones 320a-c, one for each of the three traffic lanes. In operation, the monitoring system tracks objects, such as vehicle 322, that pass through each of the three zones 320 at various times.

In step 230 of FIG. 2, a line of pixels is extracted from the image frame and added to a spatio-temporal image. As illustrated in FIG. 3a, a target line 330 is defined across the zones such that objects to be monitored (e.g., vehicle 322) will cross the target line. In the illustrated embodiment, the target line 330 is defined substantially perpendicular to the direction of travel on the roadway and spans across the zones 320, which are defined for each traffic lane. In various embodiments, the monitoring system may be configured to track objects traveling through one or more zones in a predefined trajectory that is substantially perpendicular to the target line and may include a roadway used by a metro or other motor vehicles within a metro station target scene, a set of rails used by commuter trains or other types of trains within a railway station target scene, the entrance and/or exit of an auto parking lot, parking spaces within an auto parking lot target scene, and other monitoring applications.

It will be appreciated that the zones 320 and target line 330 represent locations on the image 300 that correspond to areas in the field of view, and are indicated on the image 300 as rectangles and a line for illustrative purposes only. In operation, the image is captured without the rectangles and lines drawn thereon. The target line 330 may have a thickness of one or more rows of pixels. After the image 300 is captured, pixel values corresponding to the target line are extracted. For example, the line of pixels may represent full color pixels of the captured image, a gray scale representation of each pixel (i.e., a gray feature vector of a color image) or other image attributes.

Figure 3B:
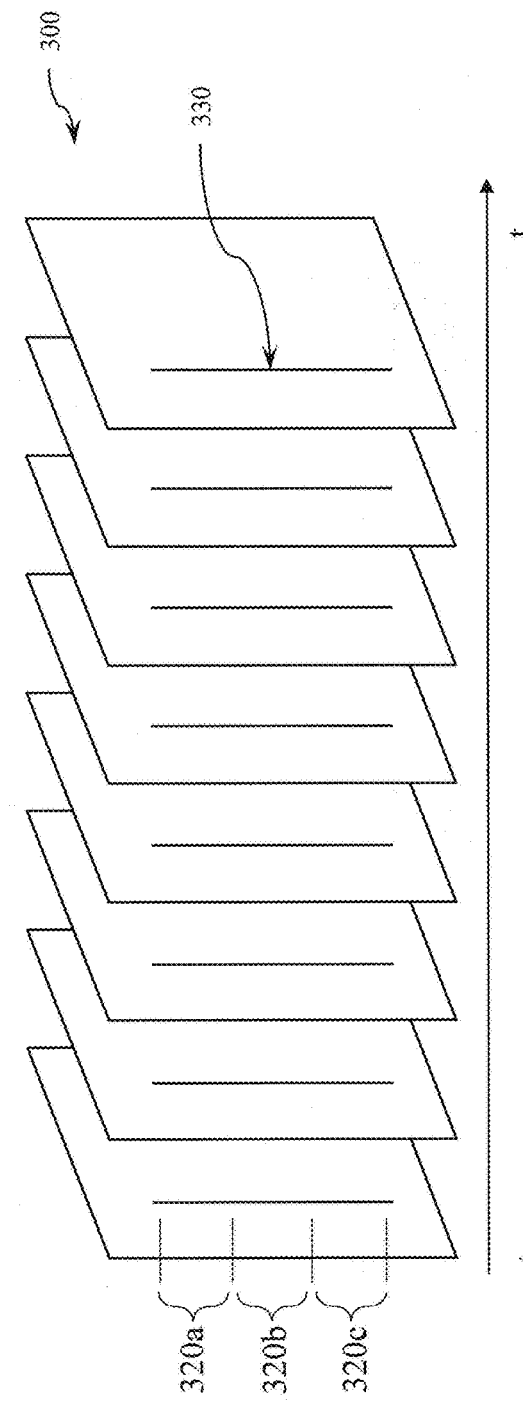
FIG. 3b illustrates a sequence of capture images in accordance with embodiments of the disclosure.

A plurality of successive image frames 300 captured by the image capture device are further illustrated in FIG. 3b. Each image frame 300 includes a plurality of pixels arranged in columns and rows. The image capture device sequentially captures a series of image frames 300, each image frame 300 including a target line of pixels 330. As illustrated, the target line 330 includes a subsection corresponding to each of the monitored zones 320a-c, which may represent a pathway of travel for an object in the scene (such as traffic lanes on a roadway).

Figure 3C:
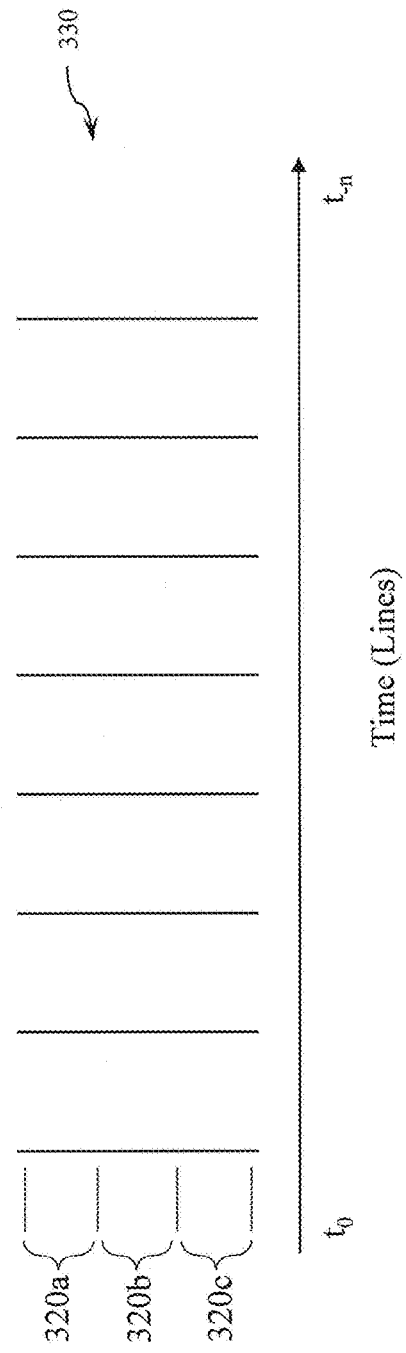
FIG. 3c illustrates a sequence of target lines extracted from a sequence of captured images in accordance with embodiments of the disclosure.

In accordance with the present embodiment, the line 330 is extracted from each successive captured image frame as illustrated in FIG. 3c. In one embodiment, the processing unit 110 receives the image frames from the image capture device 101 and extracts the target line 330 from each received image. In other embodiments, the image capture device may be configured to extract the target line 330 from the captured image and the processing unit 110 receives the extracted target lines 330.

While the present embodiment illustrates a single line across 3 zones, it will be appreciated that other quantities of zones may be monitored in an image and more than one target line may be defined in a target scene. In some embodiments, there may be more than one line defined on the target scene (such as two perpendicular lines defined to track traffic through a four way intersection), with each line processed separately as described herein.

Figure 4:
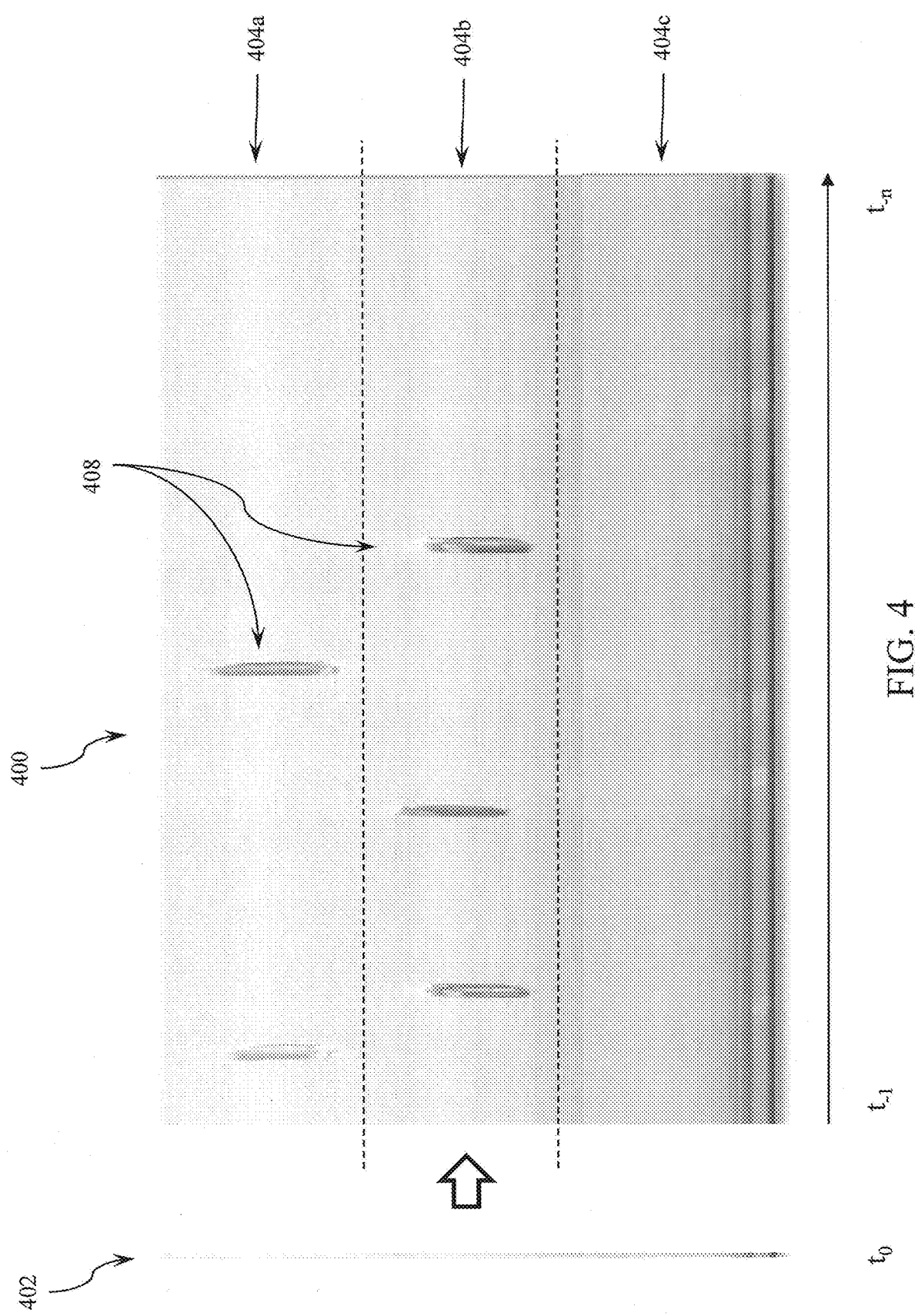
FIG. 4 illustrates an exemplary spatio-temporal image in accordance with embodiments of the disclosure.

As illustrated in FIG. 4, the extracted target lines are appended to a spatio-temporal image map 400 for further processing. The monitoring system 100 of FIG. 1 may capture successive periodic images of target scene 170 using camera 101 (e.g., a thermal camera) to capture objects 408 that move through zones 404a-c of the target scene 170. Processing component 110 may extract, from each of the images, a line of pixel values spanning across the zones and store the line of pixel values in memory component 120 as the spatio-temporal map 400. Each target line 402 extracted from a captured frame is appended to the spatio-temporal map in sequential order.

As illustrated, the current extracted target line 402 is appended adjacent to the previously extracted target line (represented by column $t_{-1}$), moving to the right of the image 400 each successive target line (column) represents an older time frame. In one embodiment, the most recent n+1 extracted target lines are stored in the memory. As each object 408 travels through one of the zones 404a-c, the object will cross the target line in one or more frames and will appear as objects 408 in the spatio-temporal image 400. Further, by defining the zones and lines in the manner described herein, the zones are represented by horizontal zones 404a-c in the spatio-temporal image.

In step 240 of FIG. 2, an edge detection module detects an edge between the most recent extracted target line ($t_0$) and the preceding target line ($t_{-1}$) and generates a new edge detection feature vector that is added to a second spatio-temporal image. Referring to FIG. 5, an exemplary embodiment of the edge detection processing will be described in further detail. As illustrated, gray feature vectors representing the extracted target line are sequentially stored in a first spatio-temporal image 510, which includes representations of objects 518 that pass across the target line in each monitored zone.

After the current target line ($t_0$) is added to the first spatio-temporal image 510, an edge detection analysis is performed. In one embodiment, an edge detection algorithm detects the occurrence and/or magnitude of edges in the target line of pixels to produce an edge detection measure. For example, the edge detection algorithm may calculate a gradient at each point of the current target line that indicates the likelihood that the pixel represents an edge of an object. In one embodiment, the pixels of the current target line are compared to adjacent pixels and the direction of the largest change from light to dark is determined as well as the magnitude or rate of the change. The resulting measure indicates the likelihood that a corresponding part of the target line represents an edge of an object.

For example, the edge detection algorithm may comprise applying a Prewitt operator, Sobel operator or other computationally efficient edge detection method, as would be understood by a person skilled in the art. In one embodiment, a Prewitt-edge is calculated between the most recent gray feature-vector and a preceding feature vector. Prewitt-edge detection is computationally efficient and allows for real-time edge detection processing of the target line. The resulting edge-magnitude is compared to a fixed edge detection threshold in a Boolean determination of whether an edge is present. The Boolean results form a corresponding Boolean feature-vector that is appended to a second spatio-temporal map 540 which represents a map of the detected edges.

In step 250 of FIG. 2, a cluster analysis of the current Boolean feature vector is performed to detect objects in the second spatio-temporal image map 540. In step 260, the detected clusters are classified using a classification algorithm and the tracking results are stored in an associated memory or database. It will be appreciated that steps 220-260 are repeated for image frame captured by the image capture device and that the various steps may be performed in parallel for different image frames and/or extracted lines.

The cluster algorithm attempts to assign each edge of the Boolean feature-vector to an existing cluster or, if an edge isn't associated with an existing cluster (i.e., the edge is the leading edge of an object) a new cluster is created. If the edge corresponds to an existing cluster from the previous Boolean feature vector, then the edge information is added to the existing cluster. As edges come in, they are clustered until the Boolean feature vector no longer includes an edge associated with the cluster. After an object is clustered, it is classified in accordance with an object classification algorithm. In the illustrated embodiment, the object may be classified as a truck or a passenger automobile. The classification information may be stored in a memory or database with other tracking information such as identification of the monitored zone, vehicle type, time and date, and other information as may be required by the system.

In various embodiments, the detected object clusters may be used for further image processing, such as motion detection to trigger actions by a video surveillance system. For example, the detected objects may trigger additional image processing on stored image frames, trigger a video surveillance system to record the image stream from the image capture device, to classify the objects and activity within the field of view, or perform other analyses and actions in accordance with the system configuration.

In one embodiment, the object classification system includes a learning model (e.g., support vector machine) that analyzes a series of training images, such as clustered objects in a spatio-temporal image maintained in accordance with embodiments described herein. The learning model may extract features vector for images containing a desired object (e.g., a truck, an automobile, human, animal, or other object), and may also extract a feature vector for negative images that do not contain the desired object. The stored images may then be used for image classification as described herein. In one embodiment, the stored object information is used in comparison to an input cluster.

In various embodiments, the processing techniques described herein may be advantageously used to monitor zones in a scene for objects, efficiently and with reductions in processing overhead associated with conventional object detection and classification approaches. For example, in various embodiments disclosed herein, a target scene background is not required to be learned and a complex classification system of objects is not required to be generated to detect and classify an object. By reducing the number of pixels undergoing analysis, object detection may be performed rapidly, and in real time as images of a target scene are captured.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    receiving a series of images of a target scene having at least one monitored zone;
    for a scene target line which is a line in a predefined position in the target scene, extracting, from each of the images, an image target line of image values, each image target line being an image of the scene target line;
    wherein the scene target line extends along its length transversely to an expected direction of travel of moving objects crossing the scene target line, each of the scene target line and the image target lines having a length greater than width;
    storing the extracted image target lines in a first spatio-temporal image; and
    analyzing the first spatio-temporal image to identify the moving objects associated with the at least one monitored zone, the objects crossing the scene target line, the objects moving away from the scene target line upon crossing the scene target line;
    wherein said analyzing comprises:
    detecting one or more edges in the first spatio-temporal image, at least one edge being defined by a plurality of the extracted image target lines; and
    classifying each said moving object based on the extracted image target lines and the one or more detected edges in the first spatio-temporal image.

2. The method of claim 1, further comprising capturing the series of images of the target scene by an imaging device, wherein the imaging device comprises a thermal camera.

3. The method of claim 1, wherein the at least one monitored zone is a fixed subset of the field of view through which the objects are monitored.

4. The method of claim 1, wherein:
    the at least one monitored zone is a plurality of monitored zones, and the scene target line extends across the monitored zones transversely to the monitored direction of travel of objects moving through the monitored zones and crossing the scene target line;

said analyzing the first spatio-temporal image comprises identifying the moving objects associated with each of the monitored zones; and said classifying each said moving object comprises classifying each said moving object as associated with the respective zone.

5. The method of claim 4, wherein each monitored zone comprises a traffic lane, and the scene target line extends across the traffic lanes and spans a width of the traffic lanes.

6. The method of claim 5 wherein said classifying comprises counting moving objects of interest that cross the scene target line.

7. The method of claim 1, wherein the detecting the one or more edges comprises detecting edges between the most recent image target line and a prior image target line.

8. The method of claim 7, further comprising creating a feature vector of the detected edges and adding the feature vector to a second spatio-temporal image.

9. The method of claim 8, further comprising applying a cluster algorithm to the second spatio-temporal image to identify clusters of edges associated with an object.

10. The method of claim 1, wherein classifying each object comprises identifying a vehicle type.

11. A system comprising:
an image capture device configured to generate a series of images of a target scene including at least one zone;
an image processor configured to extract an image target line from each image of the series of images and add the image target line to a first spatio-temporal image, wherein each image target line is an image of a scene target line in a predefined position in the target scene, the scene target line extending along its length across a path of objects moving through the at least one zone, the path crossing the scene target line and then moving away from the scene target line, each of the scene target line and the image target lines having a length greater than width;
a cluster analysis module configured to analyze the first spatio-temporal image to identify an object moving along said path;
an edge detector configured to detect one or more edges in the first spatio-temporal image, at least one edge being defined by a plurality of the extracted image target lines; and
an object classifier configured to classify the object based on the extracted image target lines and the at least one edge in the first spatio-temporal image.

12. The system of claim 11, wherein the imaging device comprises a thermal camera and/or a visible light camera.

13. The system of claim 11, wherein:
the at least one zone is a plurality of zones, and the scene target line extends substantially across the zones and is oriented transversely to a direction of travel of objects through the zones;

said analyzing the first spatio-temporal image comprises identifying the moving objects associated with each of the zones; and said classifying each said moving object comprises classifying each said moving object as associated with the respective zone.

14. The system of claim 13, wherein each zone comprises a traffic lane, and the scene target line extends across the traffic lanes and spans a width of the traffic lanes.

15. The system of claim 14 wherein the object classifier is further configured to count identified vehicle types passing through each zone.

16. The system of claim 11 wherein said at least one edge is an edge between adjacent target lines in the spatio-temporal image, and the edge detector is configured to generate an associated feature vector incorporating the detected edge information, and store the feature vector in a second spatio-temporal image.

17. The system of claim 16 wherein the cluster analysis module is further configured to analyze the feature vector to detect objects in the second spatio-temporal image.

18. The system of claim 11 further comprising a memory configured to store object tracking information associated with each zone.

19. The system of claim 11 wherein the object classifier is further configured to identify a vehicle type associated with objects traveling through a monitored zone.

20. A system comprising:
an image capture device configured to generate a series of images of a target scene including at least one zone;
an image processor configured to extract an image target line from each image of the series of images and add the image target line to a first spatio-temporal image, wherein each image target line is an image of a scene target line in a predefined position in the target scene, the scene target line extending along its length across a path of objects moving through the at least one zone, the path crossing the scene target line and then moving away from the scene target line, each of the scene target line and the image target lines having a length greater than width;
a cluster analysis module configured to analyze the first spatio-temporal image to identify moving objects crossing the scene target line;
an edge detector configured to detect one or more edges in the first spatio-temporal image, at least one edge being defined by a plurality of the extracted image target lines; and
an object classifier configured to classify the objects based on the extracted image target lines and the at least one edge in the first spatio-temporal image.

* * * * *